United States Patent [19]

Tanaka et al.

[11] Patent Number: 4,894,904
[45] Date of Patent: * Jan. 23, 1990

[54] METHOD OF FORMING ARMATURE CORE OF ELECTRIC ROTATING MACHINE

[75] Inventors: Toshinori Tanaka; Keiichi Konishi, both of Hyogo, Japan

[73] Assignee: Mitsubishi Denki Kabushiki Kaisha, Tokyo, Japan

[*] Notice: The portion of the term of this patent subsequent to Jan. 23, 2007 has been disclaimed.

[21] Appl. No.: 166,718

[22] Filed: Mar. 11, 1988

[30] Foreign Application Priority Data

Mar. 12, 1987 [JP] Japan .................................. 62-59145

[51] Int. Cl.⁴ ............................................. H02K 15/02
[52] U.S. Cl. ........................................ 29/598; 29/605; 29/609; 72/142; 310/42; 310/217
[58] Field of Search ................. 29/596, 598, 605, 609; 72/142; 310/42, 217, 218

[56] References Cited

U.S. PATENT DOCUMENTS 3,225,424 12/1965 Wiley ..................................... 29/605
4,116,033 9/1978 Iwaki et al. ............................ 72/142
4,206,621 6/1980 Kawasaki et al. ..................... 72/130

FOREIGN PATENT DOCUMENTS 195450 11/1983 Japan ..................................... 29/598

Primary Examiner—P. W. Echols
Attorney, Agent, or Firm—Wolf, Greenfield & Sacks

[57] ABSTRACT

A method of forming an armature core for an electric rotating machine is disclosed. Each band-shaped metal sheet for forming a core sheet has a multiplicity of grooves formed along a longitudinal edge which defines the inner peripheral edge of a core sheet when the metal sheet is formed into an annular disk. The metal sheet is wound around a mandrel having projections thereon so that the grooves engage with the projections, respectively. Then, the grooves which open at the inner edge of the disk are deformed so as to be closed, for example, by ironing the inner peripheral edge of the disk. Thus, the inner surface of the core sheet for press-fitting an armature rotary shaft is formed into a continuous surface with no groove opening present therein. Accordingly, when the armature rotary shaft is press-fitted into the shaft, the core sheet contacts the shaft around the complete inner circumference of the bore, thus ensuring firm press-fitting of the shaft.

7 Claims, 4 Drawing Sheets

METHOD OF FORMING ARMATURE CORE OF ELECTRIC ROTATING MACHINE

BACKGROUND OF THE INVENTION

1. Field of the Invention

The present invention relates to a method of forming an armature core of an electric rotating machine. More particularly, the present invention pertains to a method of forming a core sheet used for constituting an armature core.

2. Description of the Prior Art

The armature core of an electric rotating machine has heretofore been formed by a process of axially stacking a multiplicity of core sheets. As shown in FIG. 6, each core sheet 1 which is conventionally used for forming an armature core has the shape of an annular disk, and the radially outer portion of the core sheet 1 is provided with a multiplicity of armature coil winding slots 2 which extend radially inward, are circumferentially spaced at equal intervals and into which armature coils are to be set. The radially inner portion of the core sheet 1 is provided with a multiplicity of relatively long and narrow grooves 3 which extend radially outward. As will be clear from FIG. 6, each armature coil winding slot 2 formed in the core sheet 1 generally has the shape of the letter "V" and its opening portion 2a is somewhat narrowed. In general, such core sheet 1 is formed of a band-shaped metal sheet 4 such as that shown in FIG. 5. The metal sheet 4 has notches 2' and 3' respectively formed along two longitudinal edges thereof, in advance, the notches 2' and 3' corresponding to the slots 2 and grooves 3 of the core sheet 1, respectively.

The band-shaped metal sheet 4 is formed into the annular disk-shaped core sheet 1 by a process of winding the sheet 4 around a mandrel 5 (see FIG. 2) with one turn. The notches 3' allow the sheet 4 to be bent with no difficulty because they get narrower as the sheet 4 is bent, and with a high degree of accuracy because they engage with projections 6, respectively, which are formed on the mandrel 5.

In the above-described conventional core sheet 1, the grooves 3 which have engaged with the projections 6 on the mandrel 5 remain as shown in FIG. 6 after the process is completed. Accordingly, when an armature rotary shaft (not shown) is press-fitted into the central bore of the core sheet 1 to thereby secure the core sheet 1 to the rotary shaft, such grooves 3 cause a reduction in the area of contact between the core sheet 1 and the armature rotary shaft, resulting in a reduction in the frictional force therebetween thereby inhibiting firm press-fitting of the armature rotary shaft into the central bore of the core sheet 1.

SUMMARY OF THE INVENTION

In view of the above-described problems of the prior art, it is a primary object of the present invention to provide a method of forming an armature core of an electric rotating machine in which the frictional force imposed between a core sheet and an armature rotary shaft is enough to ensure firm press-fitting of the shaft into the shaft receiving bore of the core sheet while the core sheet has grooves which facilitate the process wherein a band-shaped metal sheet is formed into the core sheet.

To this end, the present invention provides a method of forming an armature core of an electric rotating machine which is constructed of a multiplicity of core sheets axially stacked, each of the sheets formed in disk-like shape by the steps of:

providing a band-shaped metal sheet having two longitudinal edges, one of said edges corresponding the outer circumference of said annular disk and having a multiplicity of first notches formed therealong, and the other edge corresponding to the inner circumference of said annular disk and having a multiplicity of second notches formed therealong;

winding said band-shaped metal sheet around a mandrel having projections thereon so that said second notches engage with said projections to form said annular disk; and closing said second notches at least at the inner circumference of said annular disk to form the inner circumference into a continuity.

In the armature core formed by the method of the present invention, each band-shaped metal sheet has multiplicity of grooves formed along one longitudinal edge which corresponds to the inner wall of a core sheet when the metal sheet is formed in the shape of an annular disk, and the metal sheet is wound around mandrel having projections thereon so that the grooves respectively engage with the projections as the grooves are narrowed. After the metal sheet has been formed into the annular disk, the grooves remaining at the inner edge of the disk are closed, for example, by ironing the inner edge of the disk. Thus, the inner surface of the central bore of the core sheet for press-fitting an armature rotary shaft is formed continuously and has remaining groove. Accordingly, when the armature rotary shaft is press-fitted into the bore, the core sheet contacts the shaft over the whole circumference of the inner surface of the bore.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
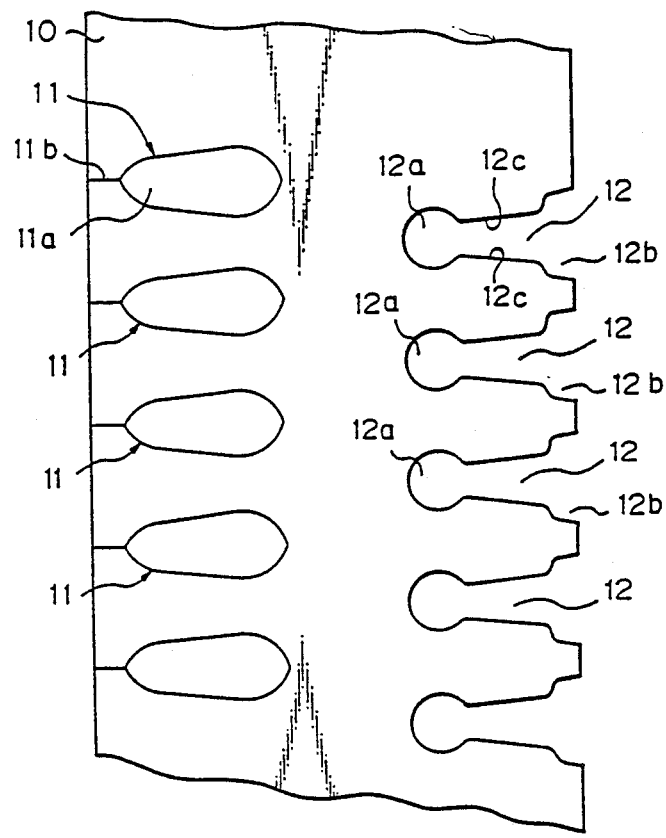
FIG. 1 is a fragmentary plan view of a part of a band-shaped metal sheet employed in the method of forming an armature core of an electric rotating machine according to the present invention.

The method of forming an armature core of an electric rotating machine according to the present invention will be described hereinunder in more detail by way of one preferred embodiment and with reference to the accompanying drawings.

The numeral 10 denotes a band-shaped metal sheet which has two longitudinal edges respectively provided with a multiplicity of notches 11 and grooves 12 at equal intervals. The notches 11 define armature coil winding slots of the core sheet. Each notch 11 has an eggplant-shaped space portion 11a extending laterally and a cut line 11b laterally extending the space portion 11 and the corresponding longitudinal edge of the metal sheet 10.

Figure 2:
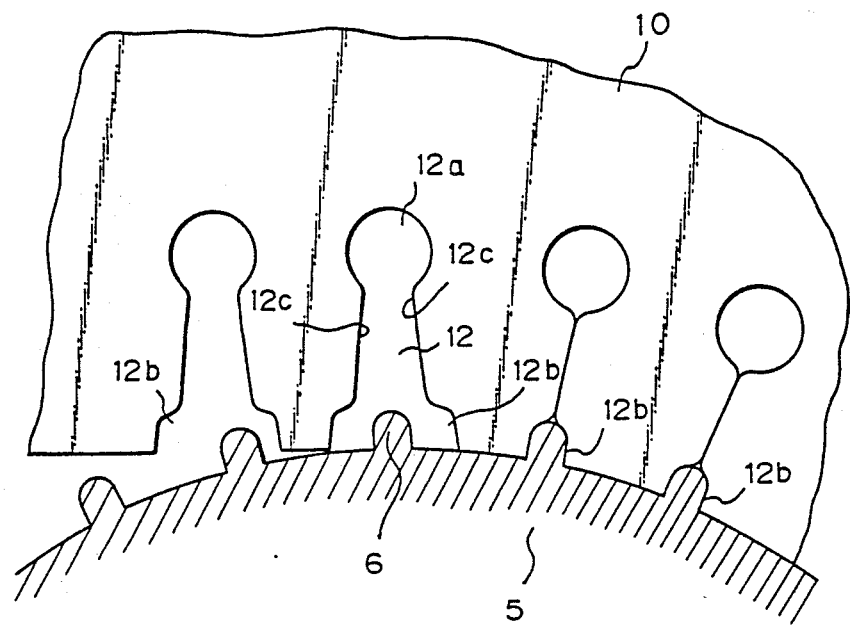
FIG. 2 is a fragmentary plan view of a part of the band-shaped metal sheet shown in FIG. 1, which shows the way in which the metal sheet is formed into annular disk-like shape by the use of a mandrel.

Each groove 12 generally has a V-shaped configuration and includes a circular portion 12a formed at the top thereof and an enlarged engagement portion 12b formed at the base thereof. The band-shaped metal sheet 10 as described hereinbefore is wound around a mandrel 5 having projections 6 thereon with one turn in such a manner that the engagement portions 12b of the grooves 12 are matched with respective projections 6, as shown in FIG. 2. As the band-shaped metal sheet 10 is bent around the mandrel 5, the engagement portions 12b clamp the respective projections 6 since the grooves 12 are narrow. The oblique sides 12c of each groove 12 are finally brought into close contact with each other.

Figure 3:
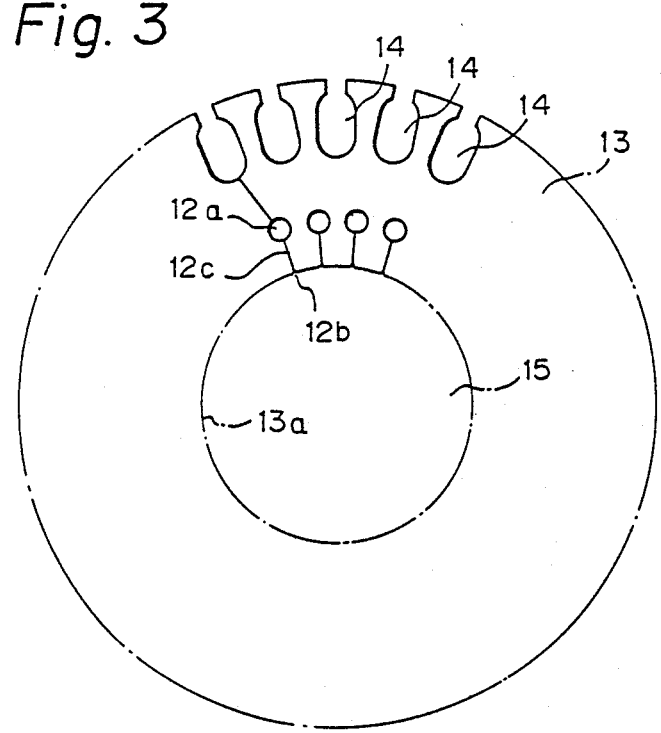
FIG. 3 is a plan view of a disk obtained by bending the band-shaped metal sheet.
Figure 4:
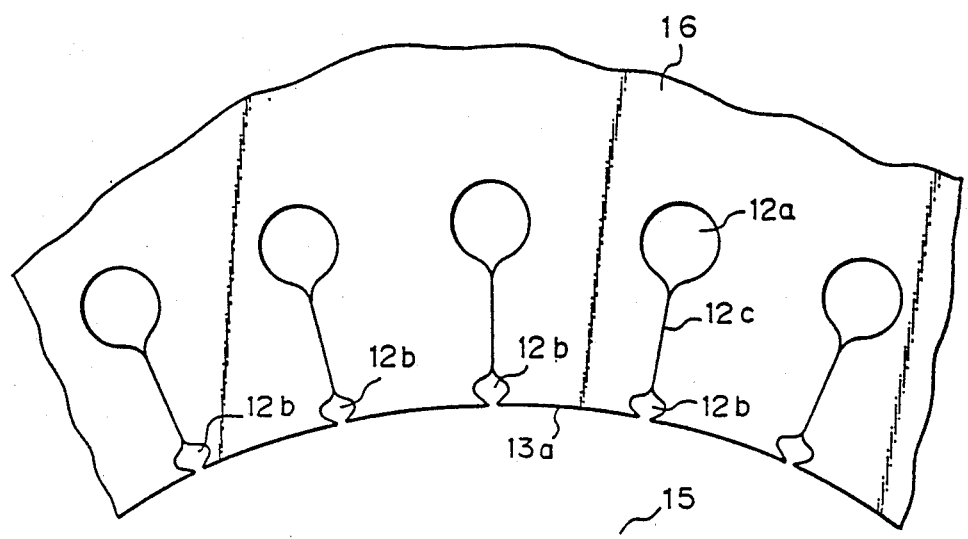
FIG. 4 is a fragmentary plan view of a part of a core sheet obtained by further working the disk shown in FIG. 3.
Figure 5:
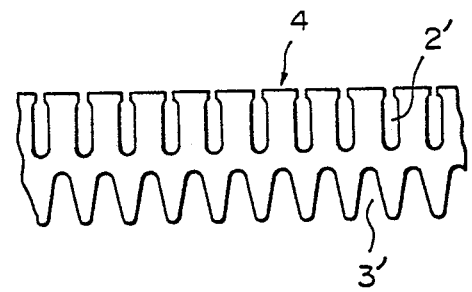
FIG. 5 is a fragmentary plan view of a part of a band-shaped metal sheet employed to form a conventional core sheet.
Figure 6:
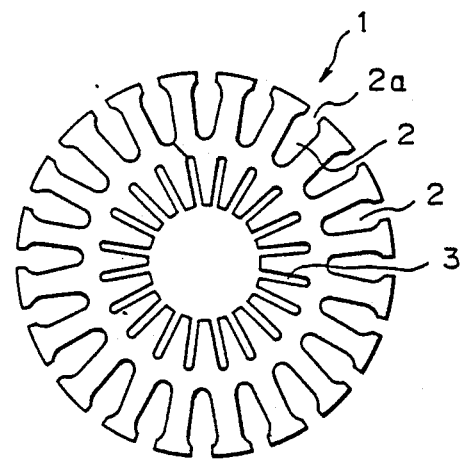
FIG. 6 is a plan view of a conventional core sheet.

On the other hand, the notches 11 are circumferentially opened as the band-shaped metal sheet 10 is bent into an annular disk-like shape. More specifically, the two edges defining the cut line 11b are circumferentially separated from each other and the eggplant-shaped portion 11a is also spread circumferentially. Since the increase in the width of the notches 11 in the circumferential direction is greater at the radially outer side than at the radially inner side, when the metal sheet 10 is formed into an annular disk 13 as shown in FIG. 3, each notch 11 is formed into an armature coil winding slot 14 of a core sheet 16 which has facing edges extending radially and parallel to each other. Then, the inner surface 13a of the annular disk is subjected to an ironing process, so that the engagement portions 12b that have engaged with the projections 6 of the mandrel 5 are deformed and thereby closed. In this way, the inner surface 13a of the annular disk is formed continuously and one core sheet 16 is thus completed.

A multiplicity of core sheets 16 thus formed are axially stacked, and an armature rotary shaft is press-fitted into a central bore 15. Since the inner surface of each core sheet 16 is continuous around the complete circumference thereof, the core sheet 16 contacts the rotary shaft at all parts of the inner circumference of the central bore 15.

Since in the foregoing embodiment notches 11 are so formed that, when the band-shaped metal sheet is shaped into an annular disk, the notches have two facing edges extending radially and parallel to each other, it is possible to effectively utilize the slot spaces particularly when the armature core is used under low-voltage and large-current conditions, such as the case of armature employed in a starting motor.

Thus, the armature core formed according to the method of the present invention has an inner surface which is continuous around the complete circumference thereof, so that, when are armature rotary shaft is press-fitted into the central bore, the inner surface of the bore contacts the shaft at all parts of the circumference. Accordingly, it is possible to increase the frictional force between the core sheet and the armature rotary shaft and to thereby ensure firm press-fitting of the shaft into the shaft receiving bore in the core sheet.

Although the present invention has been described through specific terms, it should be noted here that the described embodiment is not necessarily exclusive and various changes and modifications may be imparted thereto without departing from the scope of the invention which is limited solely by the appended claim.

What is claimed is:

1. A method of forming an armature core of an electric rotating machine, said method including the steps of:
    forming a core sheet means having an annular shape;
    said method characterized in that said step of forming the core sheet means comprises the steps of:
    providing a band-shaped metal sheet having two longitudinal edges, one of said edges corresponding to the outer circumference of said annular shape and having a multiplicity of first notches formed therealong, and the other edge corresponding to the inner circumference of said annular shape and having a multiplicity of second notches formed therealong;
    winding said band-shaped metal sheet around a mandrel having projections thereon so that said second notches engage with said projections to form said annular shape; and
    closing said second notches at least at the inner circumference of said annular shape to form the inner circumference into a continuity.

2. A method of forming an armature core as claimed in claim 1, wherein said first notches are so formed that, when said band-shaped metal sheet is formed into said annular shape, each said first notch has two facing edges extending radially and parallel to each other.

3. A method of forming an armature core as claimed in claim 1, wherein said second notches have oblique sides with converging and diverging ends, siad converging ends forming a circular portion, said oblique sides being brought into contact with each other when said band-shaped metal sheet is formed into said annular shape.

4. A method of forming an armature core as claimed in claim 1, wherein said first notches are so formed that, when said band-shaped metal sheet is formed into said annular shape, each said first notch has two facing edges extending radially and parallel to each other, and siad second notches have oblique sides with converging and diverging ends, said converging ends forming a circular portion, siad oblique sides being brought into contact with each other when siad band-shaped metal sheet is formed into said annular shape.

5. A method of forming an armature core as claimed in claim 4 wherein the step of closing said second notches includes ironing the inner surface of the annular shape so that the enlarged engagement portions are deformed and thereby closed.

6. A method of forming an armature core as claimed in claim 1 including forming a multiplicity of core sheet means which each has the shape of an annular disk, and stacking the core sheet means coaxially.

7. A method of forming an armature core as claimed in claim 1 wherein the step of winding includes winding the band-shaped sheet of metal around a mandrel to form an annular disk.

* * * * *